(12) United States Patent
Cooney

(10) Patent No.: US 11,687,855 B2
(45) Date of Patent: Jun. 27, 2023

(54) SYSTEM FOR SYNCHRONIZING ENTERTAINMENT PRODUCTION RESOURCE PROCUREMENT WITH PRODUCTION PROJECT SCHEDULING

(71) Applicant: Showrunnr, Inc., Los Angeles, CA (US)

(72) Inventor: Sean Douglas Cooney, Los Angeles, CA (US)

(73) Assignee: Showrunnr, Inc., Los Angeles, CA (US)

( * ) Notice: Subject to any disclaimer, the term of this patent is extended or adjusted under 35 U.S.C. 154(b) by 0 days.

(21) Appl. No.: 17/506,639

(22) Filed: Oct. 20, 2021

(65) Prior Publication Data

US 2022/0129812 A1    Apr. 28, 2022

Related U.S. Application Data

(60) Provisional application No. 63/105,812, filed on Oct. 26, 2020.

(51) Int. Cl.
*G06Q 10/0631* (2023.01)
*G06Q 10/06* (2023.01)
(Continued)

(52) U.S. Cl.
CPC ....... *G06Q 10/06313* (2013.01); *G06Q 10/06* (2013.01); *G06Q 10/0631* (2013.01);
(Continued)

(58) Field of Classification Search
CPC combination set(s) only.
See application file for complete search history.

(56) References Cited

U.S. PATENT DOCUMENTS

| 4,937,743 A | 6/1990 | Rassman et al. |
| 7,502,747 B1 | 3/2009 | Pardo et al. |

(Continued)

FOREIGN PATENT DOCUMENTS

| CN | 110704441 A | 1/2020 | |
| CN | 110852723 A * | 2/2020 | ........... G06Q 10/101 |

OTHER PUBLICATIONS

S. Verjans, L. K. Mogensen and J. B. Lynggaard, "Interactive collaborative production scheduling," IECON '98. Proceedings of the 24th Annual Conference of the IEEE Industrial Electronics Society (Cat. No. 98CH36200), 1998, pp. 1926-1931 vol. 4, doi: 10.1109/IECON.1998.724011. (Year: 1998).*

(Continued)

*Primary Examiner* — Crystol Stewart
(74) *Attorney, Agent, or Firm* — Perkins Coie LLP; Colin Fowler; Moeka Takagi

(57) ABSTRACT

Producing media content such as films, television shows, commercials, and other formats requires aggregating a large number of resources before, during, and after filming. A method of production scheduling that directly connects to real-time accessible marketplace resources (labor, equipment, services) to help producers find and hire the equipment, creative services, and human capital needed to produce a film or other audiovisual media is disclosed. This method helps producers schedule and book the resources they need to produce content. The resources are tied to a smart timeline that synchronizes production schedule changes against available resources. The method also alerts suppliers and producers of any changes to the production timeline.

21 Claims, 20 Drawing Sheets

(51) Int. Cl.
 *G06Q 10/10* (2023.01)
 *G06Q 10/0639* (2023.01)
 *G06Q 10/1093* (2023.01)

(52) U.S. Cl.
 CPC . *G06Q 10/06312* (2013.01); *G06Q 10/06314* (2013.01); *G06Q 10/06398* (2013.01); *G06Q 10/063112* (2013.01); *G06Q 10/063116* (2013.01); *G06Q 10/063118* (2013.01); *G06Q 10/103* (2013.01); *G06Q 10/1097* (2013.01)

(56) References Cited

U.S. PATENT DOCUMENTS

| | | | |
|---|---|---|---|
| 9,672,484 B2 * | 6/2017 | Bellini, III | G06Q 30/0635 |
| 10,198,702 B2 * | 2/2019 | Jagannathan | G06Q 10/063 |
| 10,721,377 B1 * | 7/2020 | Wu | H04N 5/23203 |
| 2007/0171224 A1 | 7/2007 | MacPherson | |
| 2007/0245300 A1 * | 10/2007 | Chan | G06Q 10/06 717/105 |
| 2009/0063245 A1 * | 3/2009 | Anderson | G06F 40/18 705/7.23 |
| 2011/0184771 A1 * | 7/2011 | Wells | G06Q 10/063114 705/7.14 |
| 2012/0110087 A1 * | 5/2012 | Culver | G06Q 10/103 709/205 |
| 2014/0032170 A1 * | 1/2014 | Pauw | G06T 11/206 702/182 |
| 2014/0180747 A1 * | 6/2014 | Solomon | G06Q 10/06314 705/7.18 |
| 2014/0350989 A1 * | 11/2014 | Telatar | G06Q 10/1097 705/7.21 |
| 2015/0006226 A1 * | 1/2015 | Smith | G06Q 10/06313 705/7.23 |
| 2015/0081366 A1 * | 3/2015 | Fernandez | G06Q 10/063114 705/7.15 |
| 2015/0170107 A1 * | 6/2015 | Itani | G06Q 10/063114 705/7.15 |
| 2015/0177952 A1 | 6/2015 | Meyer et al. | |
| 2016/0086140 A1 * | 3/2016 | Sumioka | G06Q 10/063112 705/7.14 |
| 2016/0343404 A1 | 11/2016 | Roenning | |
| 2020/0167716 A1 * | 5/2020 | Otsu | G06Q 10/063112 |
| 2021/0117907 A1 * | 4/2021 | Gray | G06F 8/70 |

OTHER PUBLICATIONS

Xu et al., Hybrid Scheduling Technique, Dec. 17, 2020, CN 114930939 A, Machine Translation (Year: 2020).*

Parveen Farooquie and J. A. Khan, "An interpretive structural model for project planning and success," 2007 IEEE International Conference on Industrial Engineering and Engineering Management, Singapore, 2007, pp. 1022-1026, doi: 10.1109/IEEM.2007. 4419347. (Year: 2007).*

"Machine Translation of CN110704441 A", Jan. 17, 2020, 23 pp.

* cited by examiner

Allow population and continuous updating of a table of categorized EXTERNAL RESOURCES with dates they are available (categorization taxonomy must align with needs taxonomy)

| Needed Resource | Available Resource | SR Category | Budget Category | Location | Rate | Date(s) Available |
|---|---|---|---|---|---|---|
| DP | John Smith | Crew | Camera | LA | 10k/wk | Resource dates |
|  | Talia Red | Crew | Camera | LA | 7k/wk | Resource dates |
|  | Marcie Land | Crew | Camera | LA | 5k/wk | Resource dates |
| LED Wall | Fuse Tech | Equipment | Camera | LA | 25k/day | Resource dates |
|  | MBSi | Equipment | Camera | LA | 15k/day | Resource dates |
|  | Lux | Equipment | Camera | LA | 12k/day | Resource dates |
| Cloud Media Storage | Box | Service | IT | LA | 100/mo | Resource dates |
|  | AWS | Service | IT | LA | 150/mo | Resource dates |
|  | Azure | Service | IT | LA | 130/mo | Resource dates |
| NLE System: AVID | CO3 | Equipment | Editorial | LA | 750/wk | Resource dates |
|  | Runway | Equipment | Editorial | LA | 600/wk | Resource dates |
|  | Hula Post | Equipment | Editorial | LA | 600/wk | Resource dates |
| Editor | Gerry Rodgers | Crew | Editorial | LA | 10k/wk | Resource dates |
|  | Jessica Nero | Crew | Editorial | LA | 7K/wk | Resource dates |
|  | Ann Starr | Crew | Editorial | LA | 5k/wk | Resource dates |
| Virtual Saloon Asset | ILM | Service | VFX | LA | 5K | Resource dates |
|  | Method | Service | VFX | LA | 7.5K | Resource dates |
|  | ZOic | Service | VFX | LA | 10K | Resource dates |

*FIG. 8*

Create a VISUAL PROJECT TIMELINE with sequential dependent phases

| Development (dates) | Prep (dates) | Prod (dates) | Post (dates) | Delivery (dates) | Launch (date) |
|---|---|---|---|---|---|
| | | | | | |

*FIG. 9*

| "Pin" NEEDED PROJECT RESOURCES to the tasks – needed resources inherit and maintain the dates of their parent tasks | Development (dates) | Prep (dates) | Prod (dates) | Post (dates) | Delivery (dates) | Launch (date) |
|---|---|---|---|---|---|---|
| | | Task: Asset Build (dates)<br>Needed Resource 1 – VFX Salloon (dates)<br>Needed Resource 2 – Cloud Media Storage (dates) | Task: Shoot Scene 1 (dates)<br>Needed Resource 3 – DP (dates)<br>Needed Resource 4 – Camera (dates) | Task: Edit (dates)<br>Needed Resource 5 – Editor (dates)<br>Needed Resource 6 – NLE Edit System (dates) | | |

*FIG. 11*

| Automatically MATCH available external resources with needed project resources based on taxonomy and dates | | | | | |
|---|---|---|---|---|---|
| Development (dates) | Prep (dates) | Prod (dates) | Post (dates) | Delivery (dates) | Launch (date) |
| | Task: Asset Build (dates)<br><br>Needed Resource 1 – VFX Salloon (dates)<br>- Avail VFX Choice 1<br>- Avail VFX Choice 2<br>- Avail VFX Choice 3<br><br>Needed Resource 2 – Cloud Media Storage (dates)<br>- Avail Cloud Choice 1<br>- Avail Cloud Choice 2<br>- Avail Cloud Choice 3 | Task: Shoot Scene 1 (dates)<br><br>Needed Resource 3 – DP (dates)<br>- Avail DP Choice 1<br>- Avail DP Choice 2<br>- Avail DP Choice 3<br><br>Needed Resource 4 – Camera (dates)<br>- Avail Camera Choice 1<br>- Avail Camera Choice 2<br>- Avail Camera Choice 3 | Task: Edit (dates)<br><br>Needed Resource 5 – Editor (dates)<br>- Avail Editor Choice 1<br>- Avail Editor Choice 2<br>- Avail Editor Choice 3<br><br>Needed Resource 6 – NLE Edit System (dates)<br>- Avail NLE Choice 1<br>- Avail NLE Choice 2<br>- Avail NLE Choice 3 | | |

*FIG. 12*

SYSTEM FOR SYNCHRONIZING ENTERTAINMENT PRODUCTION RESOURCE PROCUREMENT WITH PRODUCTION PROJECT SCHEDULING

CROSS-REFERENCE TO RELATED APPLICATIONS

This application claims priority to provisional patent application No. 63/105,812, titled "SYSTEM FOR SYNCHRONIZING ENTERTAINMENT PRODUCTION RESOURCE PROCUREMENT WITH PRODUCTION PROJECT SCHEDULING," filed Oct. 26, 2020, the disclosure of which is hereby incorporated by reference herein.

TECHNICAL FIELD

This application relates to the media and entertainment industry.

BACKGROUND

The audio video content production industry is very decentralized and relies on many different businesses, talent and independent contractors to bring together the resources necessary to produce films, television shows, commercials and other video content. Resources from actors to sound stages to camera equipment must be identified and scheduled on appropriate days and hours. Currently these resources are scheduled manually by individual creators and individuals hired to locate, contract and book the resource. Computer technology for matching resources to projects and tracking these associations and related data is currently limited to computer implemented spreadsheets.

The media and entertainment industry depends on a fragmented supply chain that makes creation of their products (e.g., films, shows, videos) heavily reliant on specialized freelance and corporate headcount to manually forecast, track, and manage delays, disruptions, and unexpected costs. Behind the scenes, content producers and studios continue to manage production planning spreadsheets, scheduling, and resource procurement, and to reconcile booked resources against ongoing schedule changes using tools and methods that have not changed for decades. All media productions expend large amounts of human and financial capital to work around the system's fragmentation.

BRIEF DESCRIPTION OF THE DRAWINGS

The description of illustrative embodiments of the present invention will be more fully understood upon consideration of the following detailed description and attached drawings, in which like reference numbers denote like system components and/or method steps, as appropriate, and in which:

FIG. 8 illustrates an exemplary table of resources that is continuously updated.

FIG. 9 illustrates a timeline showing the different phases of the production process.

FIG. 11 illustrates tasks pinned to the timeline with resources needed for each task.

FIG. 12 illustrates tasks pinned to the timeline with matched available resources for the task.

DETAILED DESCRIPTION

Figure 1:
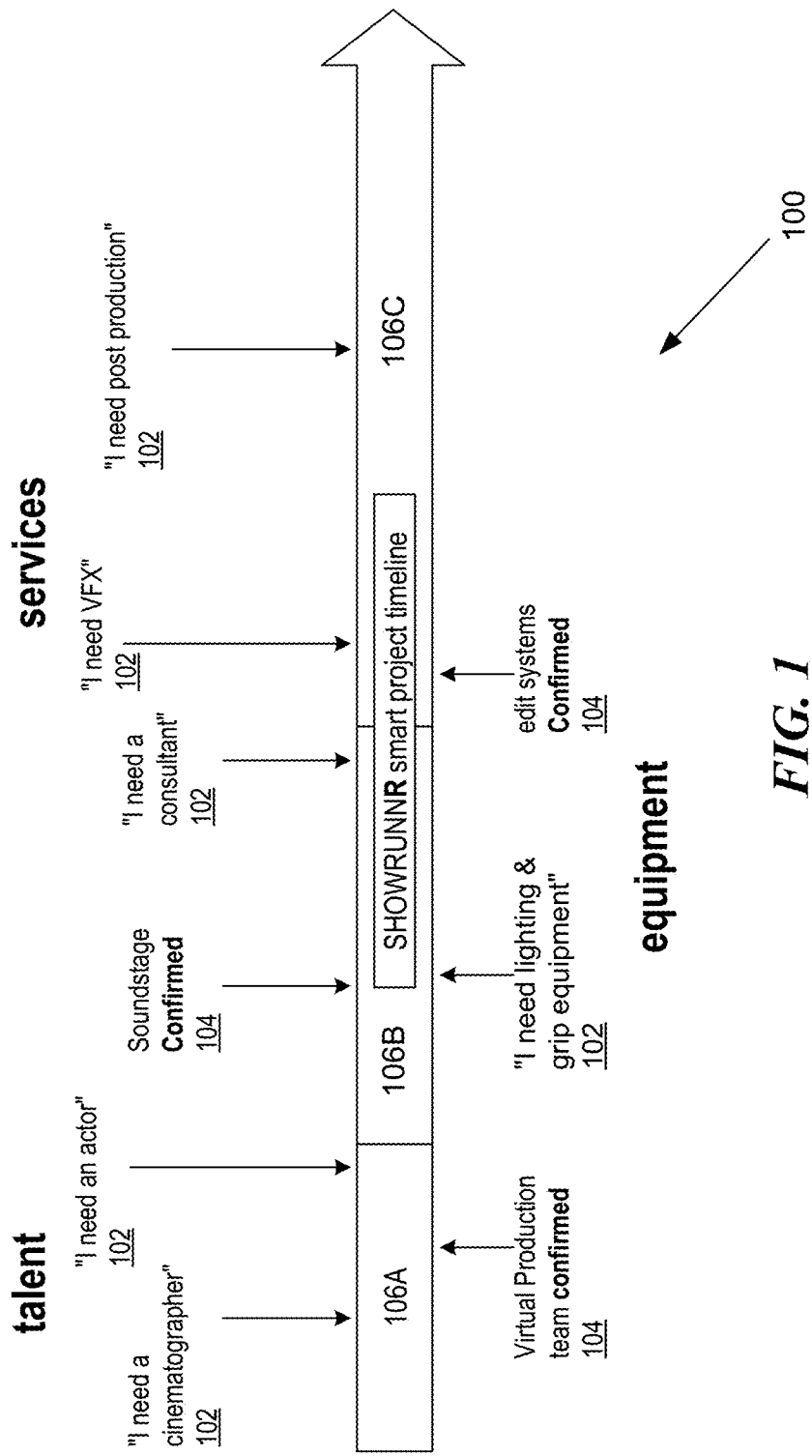
FIG. 1 illustrates a timeline for a film, television episode, or other media production.

In an increasingly bottom-line-conscious economic climate, the "old" methods for scheduling content production do not provide necessary visibility and predictability that such a large-scale investment deserves and requires. Many vendor databases are accessed, stored, and updated on computer systems. The proposed method provides a means to combine these databases in a network system and create a master database that can be used in scheduling and booking resources.

To address this industry pain point and solve its historically fragmented production supply chain problem, a method is disclosed for production planning and scheduling using a computing system that directly connects to resources (labor, equipment, services) using an online computer network to help producers find and hire the equipment, creative services, and human capital needed as they go. This method helps producers schedule and book the resources they need, which are tied to a smart timeline that synchronizes production schedule changes against available resources and keeps supply—and demand-side entities informed of changes using a computer network system. A demand-side entity (e.g., user) is a producer of a media project or another entity that is scheduling a complex project. A supply-side entity (e.g., also a user) is a vendor, talent, venues, or equipment.

The present invention contemplates a variety of improved methods and systems for finding and procuring resources along a timeline for a production. While embodiments related to media production are disclosed below, other uses for the disclosed invention are contemplated by this disclosure. The method uses a computing system to obtain data from online databases and other applications. Then the computing system organizes that data onto a timeline and into categories. The data is organized into a query-based index. Once the data has been organized, then the data is transformed into an easily searchable database that significantly improves the speed of finding and booking resources and cuts down on manpower needed to schedule resources for a film production or other media production.

A media production user enters basic information about a project schedule (start date, finish date, phases in between) and attaches tasks and needs to specific milestones and phases along the timeline. The user can then place holds and bookings on resources related to the milestones and phases through the computing system. If the timeline shifts at any point, for example due to delays in financing or changes in availability of other resources, all of the needed resource placeholders automatically shift, and any resources that have already been put on hold or booked within the system are notified and able to provide new availability through the system either manually or automatically through API connections. Similarly, if resource availability changes, this information can be directly communicated to the demand-side user as a "conflict" and allow them to address the new change, either by selecting an alternate resource or paying to secure the at-risk resource.

Resources for a media production include personnel, equipment, and services. Corresponding resources fora specific milestone or task must be scheduled on corresponding days and for sufficient periods of time. The schedule to coordinate all of these resources is currently set and communicated manually. Individuals contact each resource or its vendor and set up the contract and the time schedule for when the resource is available.

Resources to be booked for a media production can include talent and personnel, filming locations, equipment, and services. Talent and personnel include actors and actresses, directors, labor, assistants, and producers. Filming locations to be booked include sound stages, on-site filming locations, and locations for b-roll footage. Equipment can include cameras, props, computers, microphones, lighting, and other items that can be rented. Services to be booked include such things as Kraft food services, editing services, sound editing services, and special effects services.

Each resource is currently individually booked with its own contracts, rental rates, and availability schedule. An individual working for the media producer coordinates with each resource, schedules the resource, and handles payment and contracts. Each resource is booked for an individual time slot. The schedules are created using spreadsheets with minimal ability to automatically update.

Under current practices when a resource is booked, some attention is paid to additional availability dates, but typically the future schedule is not addressed at the time of initial booking. The disclosed computer system has the ability to record all available dates for a resource by accessing a vendor's online inventory and then plotting available and unavailable times for that inventory on a timeline. By plotting the inventory on a timeline, the system transforms the data into readily accessible information for a producer, thus reducing the amount of time and number of persons needed to produce a media project.

Commonly delays and conflicts occur during the filming process. These delays can occur for a variety of reasons including an actor or actress having another commitment or a weather delay. If one milestone or task of the production process is delayed, then each remaining milestone or task can also be affected and delayed. To accommodate these delays, individuals must review the schedule and determine each resource that was booked for each time period and contact the vendor or manager to delay the time period when that resource will be used.

Identifying each of the resources that will be affected by a delay without a notification system is a difficult task. Especially because, under current practices, resources are organized on spreadsheets or systems that are disconnected from "live" resource availability information without smart capabilities and therefore an individual must contact resources directly and/or look through each of the contracts and lists of equipment, personnel, and services to determine which resources will be affected and how.

Each resource has its own individual contract governing price and other terms and conditions. A delay in the production schedule can affect the contract for various resources. While these contracts may be stored in an online database, they are not tied to the timeline of the media project. The disclosed system ties contracts and availability dates to the smart timeline where they can be easily accessed, reviewed, and modified.

A method for aggregating the different resources using a computing system is described below. The computing system disclosed provides various functionality for scheduling resources for a media production. Some of the different functional capabilities are identifying which resources are affected by a delay, alerting a user that the specific resources will be affected, identifying a new potential time slot for the task, rescheduling the task and/or resources for the new time slot, and rebooking the resources for the new time slot.

According to one embodiment, equipment lists and schedules from vendors are aggregated in the system providing a timeline of when equipment, personnel, locations, and services are available. Each resource is entered and matched with a corresponding purpose or task. Alternatively, a milestone or task is entered and the computing system suggests corresponding resources that a user can match to the milestone or task. Matching can be performed by the user when they enter the task or automatically by the system. When the time schedule for the purpose or task is entered, then the resource is linked to that portion of the schedule. If there is a delay in the timeline, then each resource that will be delayed is identified and flagged to be rescheduled. Then an alert is sent to a user notifying them of the resource that is affected and how it is affected.

According to one embodiment, the system is linked to the inventory database for outside vendors creating a master database of resources and their availability. When the system is linked, the outside vendors can upload the pieces of equipment or other resources available and the time periods when the resource is available. A user who wants to book a resource for a media production can review the availability for the resource to determine whether the resource is available or unavailable for a desired time period, or when the resource will next be available.

The system can identify scheduling conflicts. The computing system determines that a particular resource such as a location, piece of equipment, personnel, or service is not available during a particular time period. According to one embodiment, the system then alerts the media production user of the impending conflict. The user could also review the timeline to see that there are no other times when that resource can be used and then the user will be alerted that they must find a substitute resource. The computing system, according to another embodiment, identifies substitute resources within the database and suggests them to a user.

The computing system sends an alert for each projected conflict on the schedule. Alerts are sent when a schedule for a resource or a task is first entered. These alerts notify a user of scheduling conflicts. An alert is also sent if the schedule for a resource or task is updated and that update delays the schedule of subsequent resources or tasks. The alert can include information that the updated schedule necessitates the rebooking of resources.

After the system has sent alerts for a conflict in the schedule, then the system, according to one embodiment, performs a lookup in the aggregated resource database to determine when each resource is next available. For example, if an actor is not available on May 3-5 as originally planned, but instead is available on May 6-25, then the system can check to see if the sound stage and other resources are available on the dates of May 6-25. The system determines that the sound stage is unavailable on May 6-10 but is available on May 11-25. Then the system automatically determines when other needed resources corresponding to that same scene are available and suggests booking the stage on May 18-21 when all of the needed resources are available.

According to another embodiment, the system will execute instructions to rebook a resource when a new scheduling timeline is established. To rebook a resource, the system sends an inquiry to the vendor to determine when the resource or a substitute is available, then the system selects the appropriate dates for the task and establishes a contract with the vendor. The contract with the vendor establishes the dates and times the resource is needed and various other terms and conditions such as the cost. Once the resource is booked, the system, according to one embodiment, alerts a user that the resource has been rebooked for the new time.

According to another embodiment, the system receives notification that a task or milestone is delayed. First, the system queries the timeline to determine which subsequent tasks will be affected. Second, the system determines which resources associated with those tasks will be affected. Third, the system rebooks all of the affected resources according to the new timeline, and fourth, alerts the user after the entire timeline has been updated with the changes that were made. Additionally, if a resource is placed on hold for specific dates, the system updates the timeline reflecting that change. Anytime a phase or milestone is changed, other dates on the timeline ripple to change automatically, unless the user specifies otherwise.

FIG. 1 illustrates a timeline 100 fora film, television episode or other media production. When a project is initially created within the system, the system generates a timeline that can be populated with all of the tasks 102 for the project. Resources 104 can then be associated with each task. FIG. 1 shows how project needs are attached to a single visual project timeline. The sections within the horizontal arrow show different phases 106 within the production process, namely pre-production 106A, filming 106B, and post-production 106C. Resources 104 comprising a script, an actress, camera equipment, a soundstage, editors, and color correction are identified and tagged on the timeline. The resources 104 are matched with tasks and become confirm ed.

Figure 2:
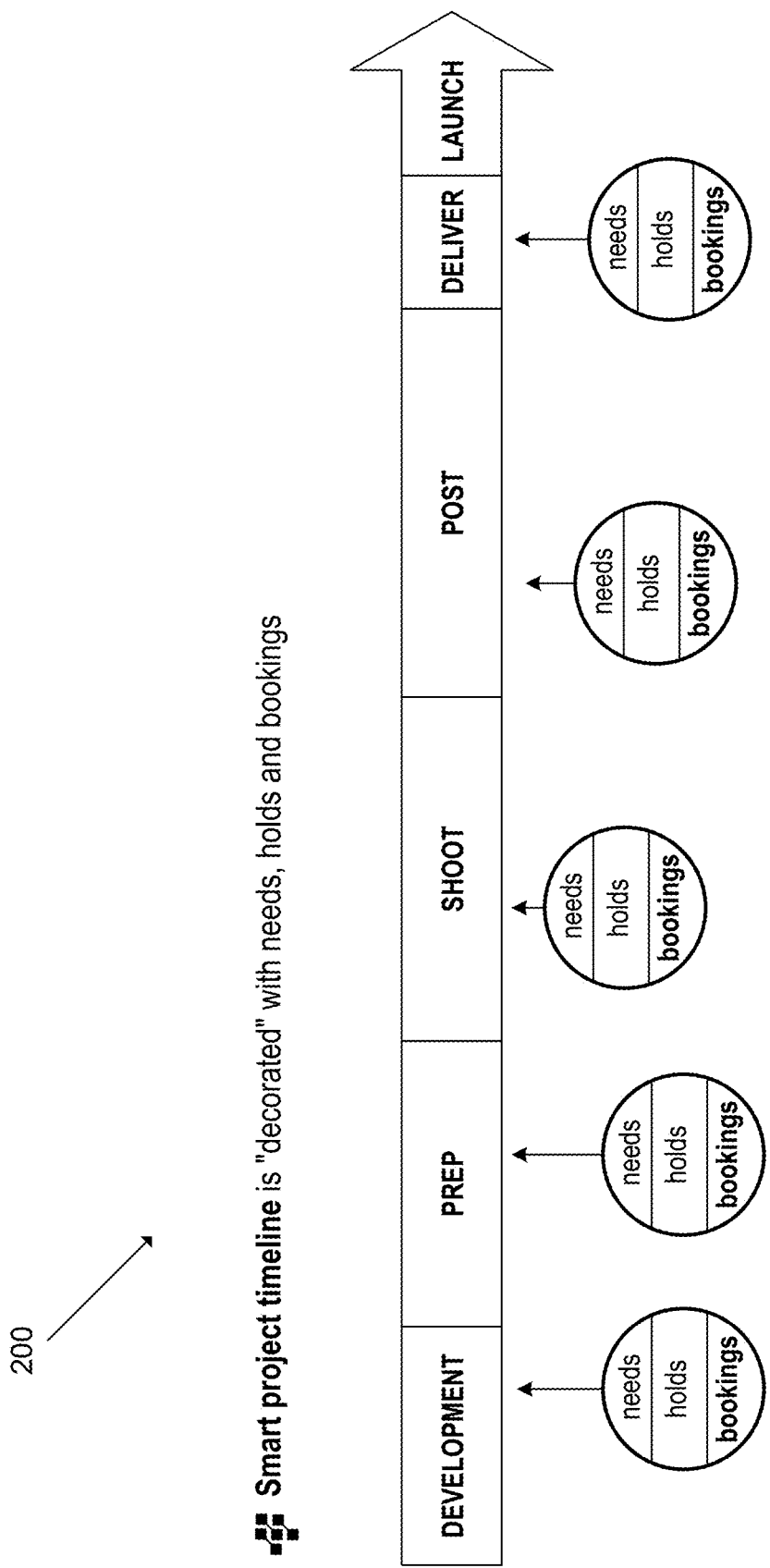
FIG. 2 illustrates a timeline ready to be populated with needs, holds, and bookings.

FIG. 2 illustrates a timeline 200 ready to be populated with needs, holds, and bookings. At this stage, the timeline 200 created by the system is ready to be populated with the resources needed for the media production project. This view is shown to a user when they are first starting a media production project. As tasks are placed on the timeline, the system records relationships between various tasks so that the system can later dynamically update the timeline if a task is delayed. After a task is placed on the timeline, then a user selects resources for that task. The system has preset parameters for various tasks. The system can therefore suggest resources for specific tasks, speeding up the process of assigning resources for tasks.

Resources can be categorized into needs, holds or bookings. Bookings indicate that a given resource has been matched to a task for a given time window. Holds indicate that the resource has been instructed to keep a window open on their schedule. Needs indicate resource requirements that need filling as related to a given task.

Figure 3:
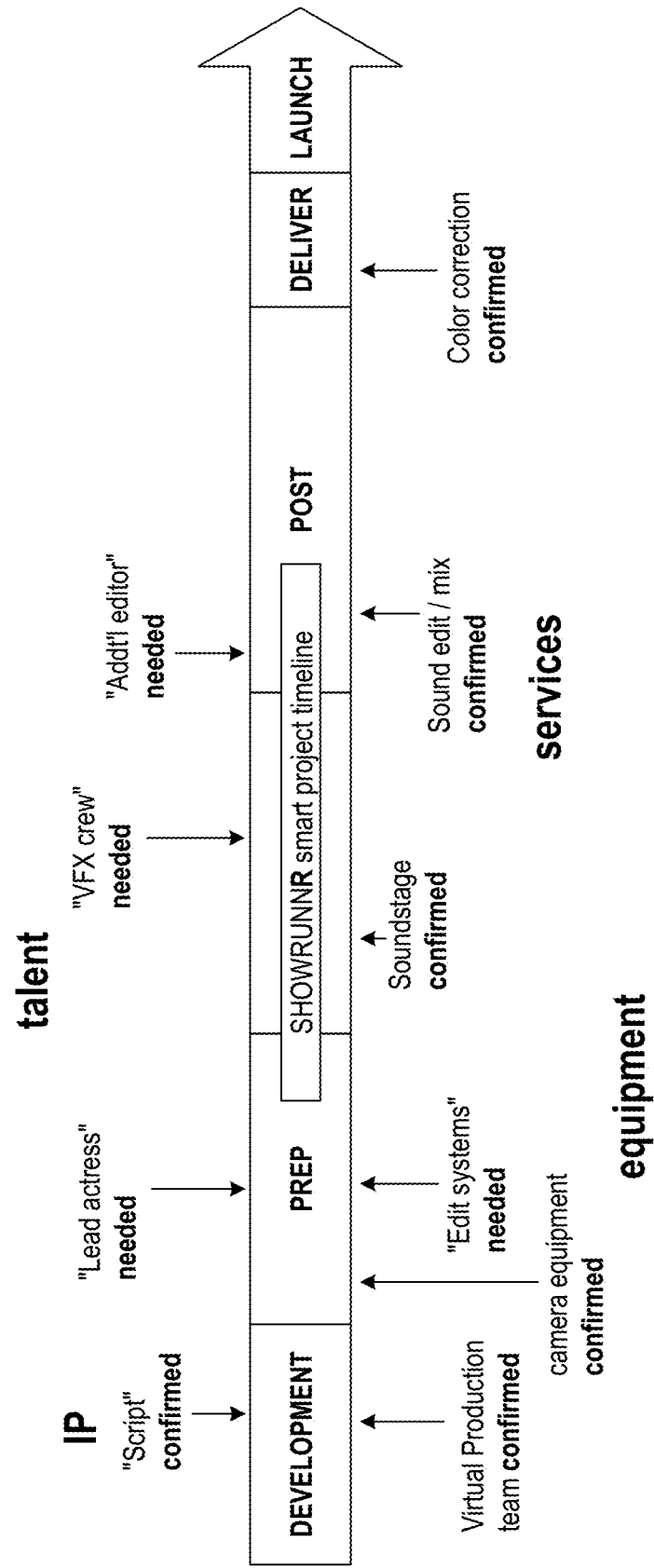
FIG. 3 illustrates a timeline for a film, television episode, or other media production populated with the status of the resources.

FIG. 3 illustrates a timeline for a film, television episode, or other media production populated with the status of the resources. Here, resources are shown with their current status. Prior to beginning and during the media production process, all of the resources are labeled as either needed or confirmed. Within the system a user can search for a specific resource such as a specific camera and the system displays a bird's eye view of the timeline and where the searched-for item falls on the timeline.

According to another embodiment, a user can select whether the project is a standalone production such as a film or an episodic series production. If the user selects a series, the system displays timelines for each episode. Episodic scheduling can accommodate flexible block episodes and scene groupings around resource availability. Entry of basic show components such as locations and key crew can be entered into the system by a user. Therefore, if a task is delayed, the system can dynamically update the schedule for all of the episodes affected by the delay.

According to another embodiment, the script, schedule, and budget files can be uploaded directly into the system. In some embodiments, each of these files may be mined via a natural language processor. The natural language processor identifies content from within the file and extracts that content to fill out the timeline. A user can enter specific dates for specific tasks or resources as they are scheduled. A user can view related item categories in different phases of the media production. For example, a user can view camera rental in each phase of the project.

Figure 4:
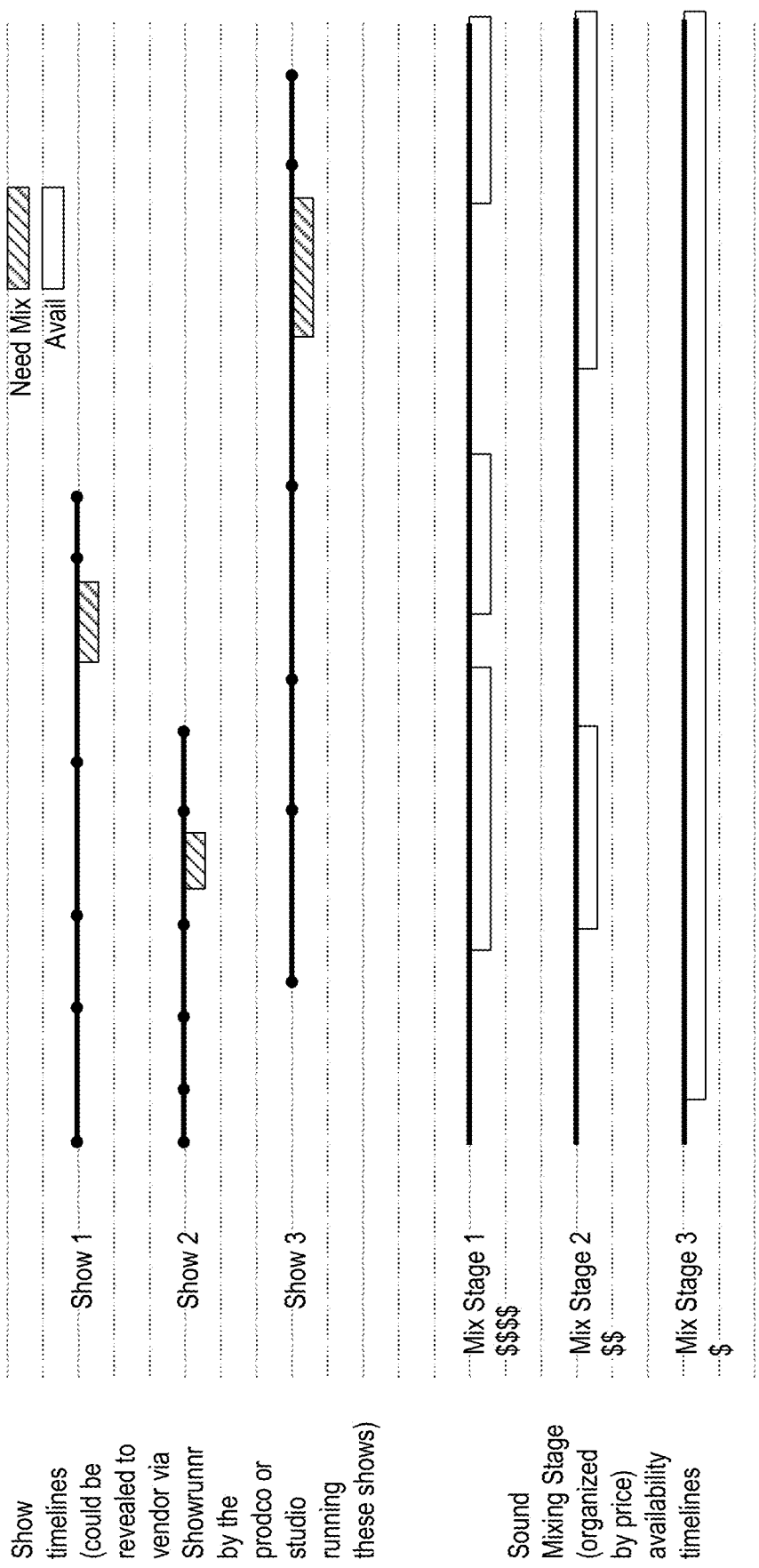
FIG. 4 illustrates timelines from a vendor's point of view.

FIG. 4 illustrates a timeline according to a supply-side entity. The point of view of a sound services vendor is shown along with mix stage availability. The top section of the figure shows timelines for various shows and when they will need to be mixed. The bottom section of the figure shows the availability for the sound mixing stages. These are organized from top to bottom according to price.

Given the schedule needs of the shows, the vendor is enabled to visualize when they may be needed and when the equipment for their work is available for them. The equipment is further sorted according to metadata characteristics such as price.

Figure 5:
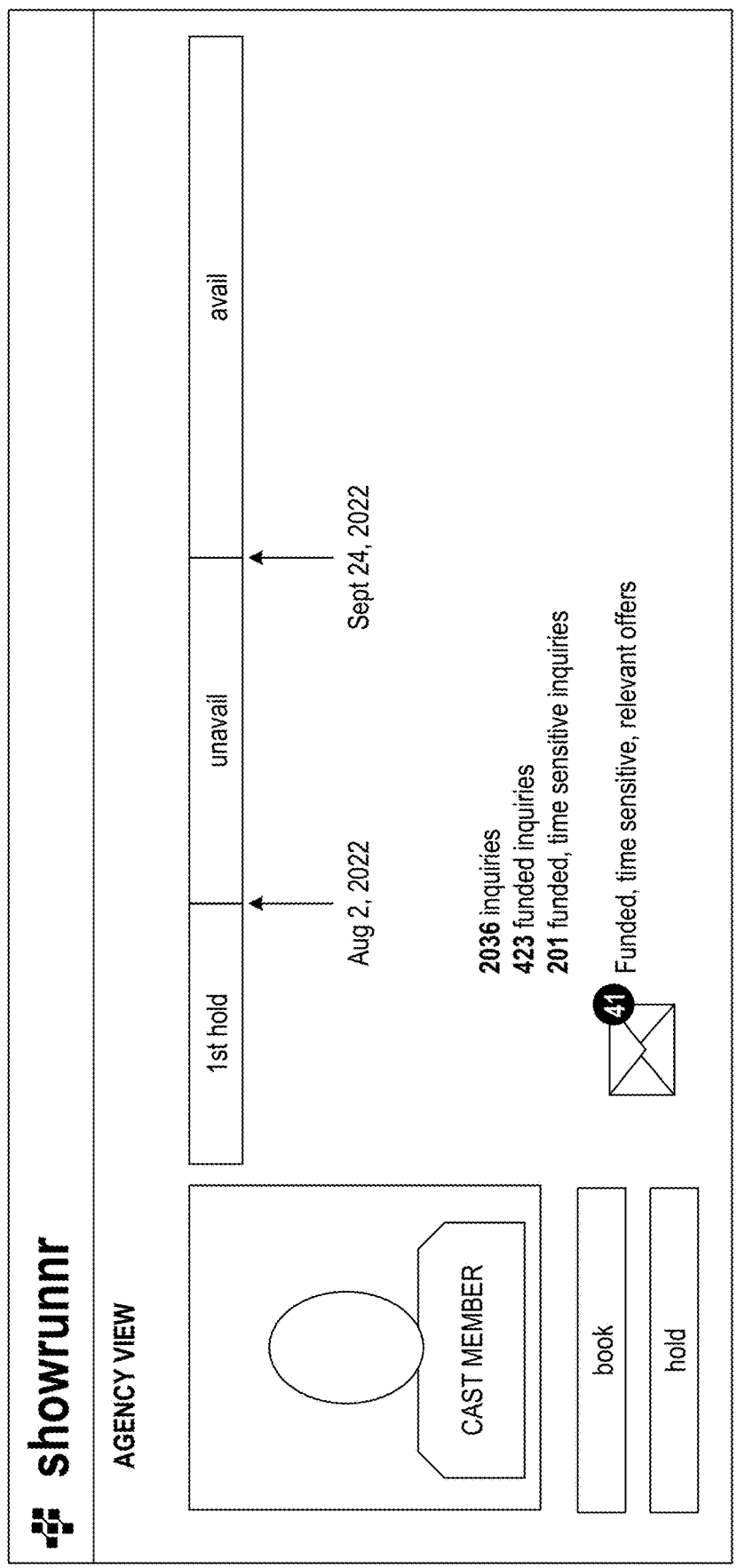
FIG. 5 illustrates an availability timeline fora cast member.

FIG. 5 illustrates an availability timeline for a cast member. This view is displayed to vendors. A casting agency, the supplier for an actor, sees this view when logged in to the system. The system displays when the actor is available or unavailable, how many inquiries have been received for the actor, how many of those inquiries were funded, and how many are funded, time sensitive inquiries. Requests made by media production users who are trying to book the actor are also displayed in this centralized view. The system aggregates data about the actor and displays it all together in this view.

Figure 6:
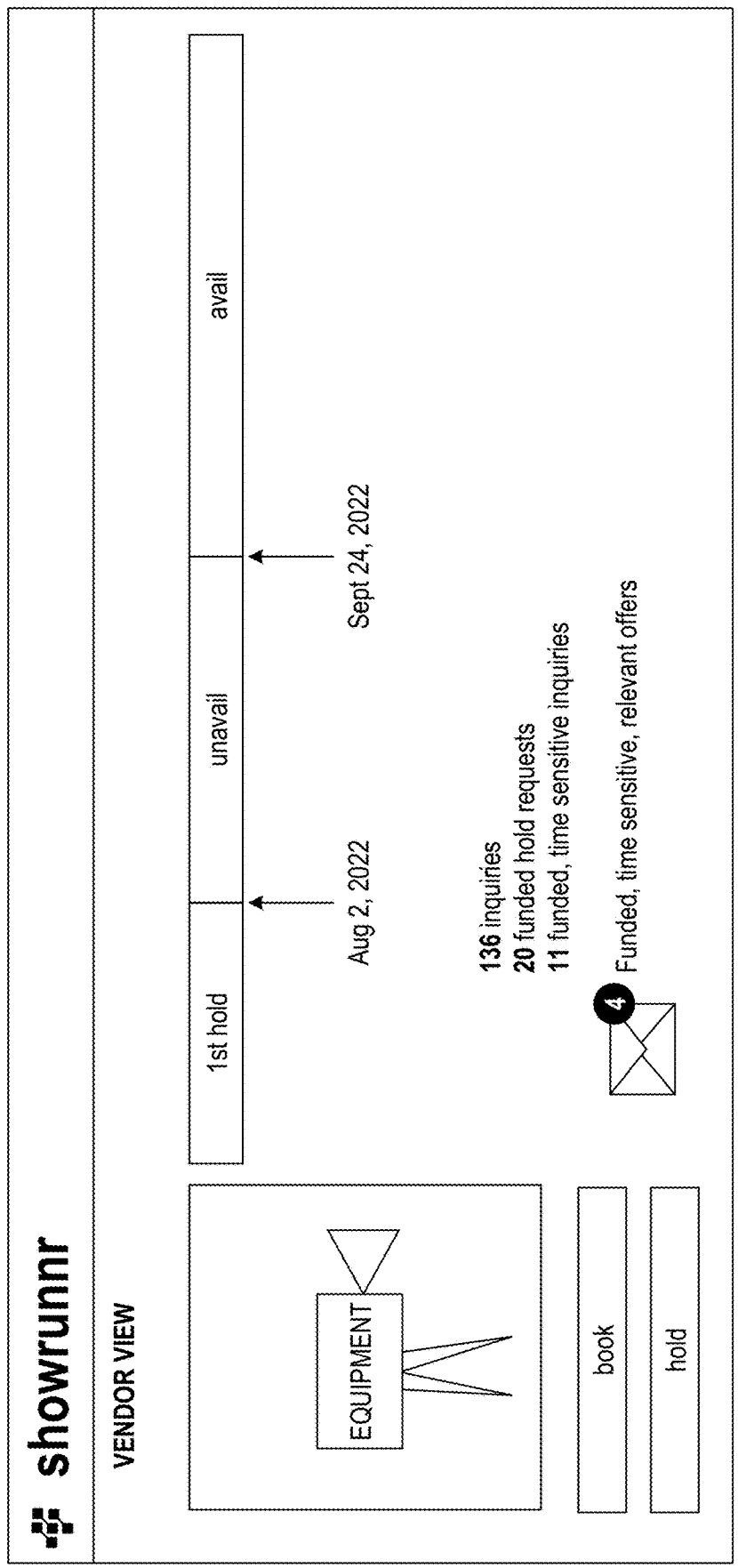
FIG. 6 illustrates an availability timeline fora camera.

FIG. 6 illustrates an availability timeline for a camera. This view is displayed to vendors when logged in to the system. The system displays when the camera is available or unavailable, how many inquiries have been received for the camera, how many of those inquiries were funded, and how many are funded, time sensitive inquiries. Requests made by media production users who are trying to book the camera are also displayed in this centralized view. The system aggregates data about the actor and displays it all together in this view.

Figure 7:
FIG. 7 illustrates the user interface for the system.

FIG. 7 illustrates the user interface for the system. This view is shown to a media production user of the system. First, the user enters information about the media production into the system. Second, the system displays suggested resources and an initial timeline, then the user selects which resources the project will need and when. Third, the user is moved on to a new screen where they can book various resources for specific times.

FIG. 8 illustrates an exemplary table of resources that is continuously updated. The table shown is continuously updated with information about resources from vendors. All resources shown here are external resources that are not supplied by the production company itself. For example, categories of information about the resources can include needed resource, available resource, service category, budget category, location, rate, and date(s) available. According to one embodiment, the categorization taxonomy of the resource must align with the needs taxonomy. Because the aggregated data around all resources attached to a given production includes pricing data, scenarios can be run to determine the total budget impact of changes to resources and schedule.

In some embodiments, some resources are indicated as non-variable. Non-variable resources are those that cannot be substituted for comparable resources. For example, a lead actor may be irreplaceable. In such circumstances, the non-variable resource controls other resources that are booked. If the schedule of the non-variable resource changes, the other resources need to be rebooked accordingly, or replaced.

FIG. 9 illustrates a timeline showing the different phases of the production process. A media producer user enters the various phases of the project. The phases are linked sequentially. Organizing the phases sequentially provides the system with a framework for updating the timeline as specific dates are entered into the timeline. Potential phases that can be entered include development, preparation, production, post production, delivery, and launch.

The dates represent time windows for which resources are booked. The resources may not actually be used during the full length of the time window, but rather need to be available for the whole-time window based on potential sliding availabilities of other resources. Time window scheduling refers to scheduling that is greater than a moment in time. Scheduling thus becomes both a matter of identifying a time window and identifying a period for performance within that time window.

Figure 10:
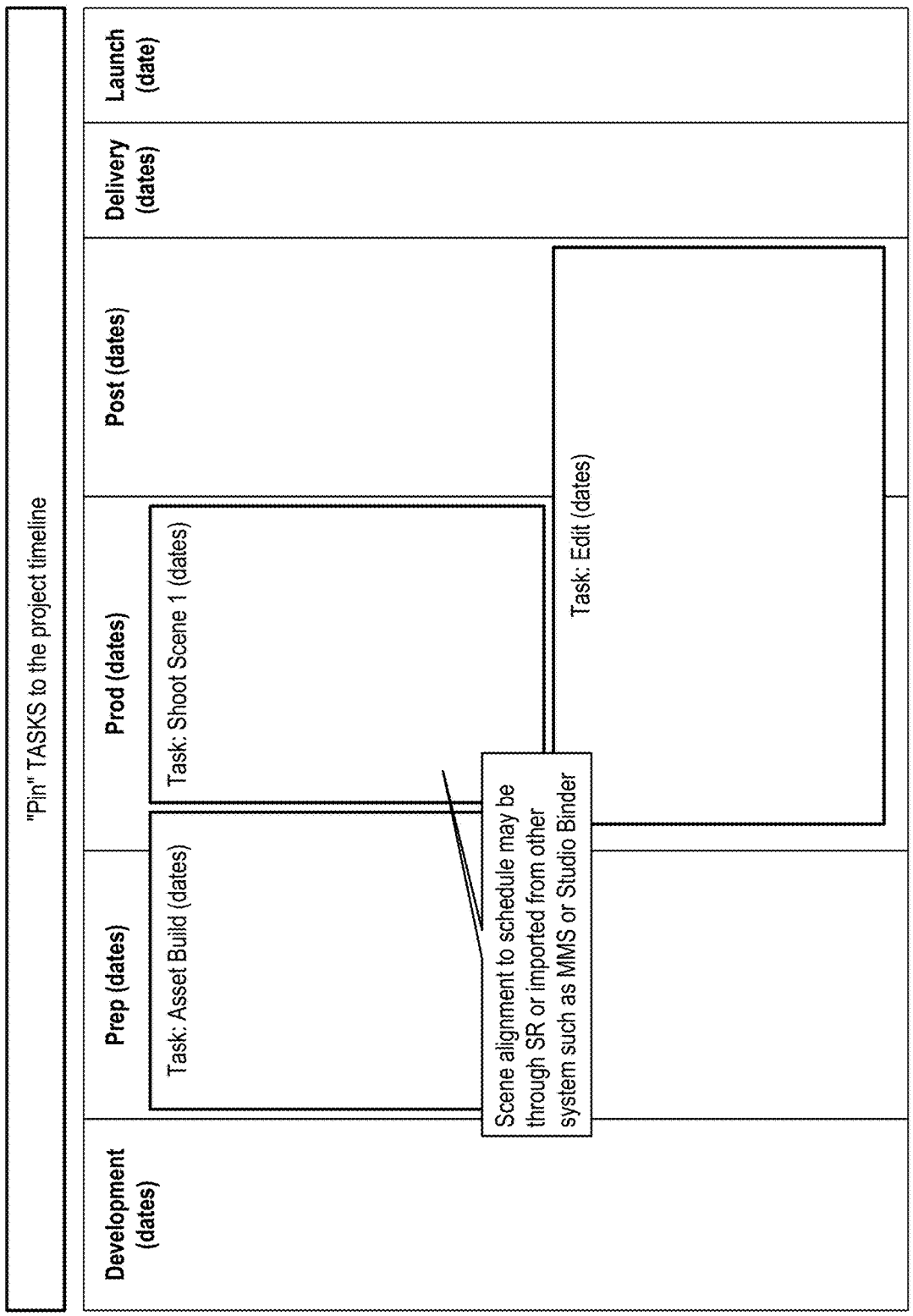
FIG. 10 illustrates a timeline with tasks pinned to the timeline.

FIG. 10 illustrates a timeline with initial tasks pinned to the timeline. Once the phases have been organized in sequential order, then tasks are pinned onto the timeline. A task can correspond to one phase or multiple phases. A non-exhaustive list of exemplary tasks includes asset building, shoot scenes, and editing. Some tasks can be imported from another system to provide easy integration with other computing systems. Tasks pinned to the timeline indicate time windows for the given task. Performance of the task may encompass the entire time window, or a shorter period of time.

FIG. 11 illustrates tasks pinned to the timeline with resources needed for each task. Here, the general type of resource needed is pinned to a task. As the resources are pinned, they inherit and maintain the dates of the parent task. In some embodiments, adding a resource to a task automatically attempts to book that resource (where bookable). Where the resource and the production timeline operate user accounts on a given scheduling platform, scheduling communication is facilitated by the platform. Slotting a given resource onto a task causes the platform to transmit a booking request to the resource. If the resource indicates via a user account setting that they are open to bookings either by any planner user (who controls the production timeline), or a specific planner user, the booking request is automatically accepted.

FIG. 12 illustrates tasks pinned to the timeline with matching available resources for the task. The system automatically populates the needed resource with available resources that match the taxonomy and dates of the needed resource. For example, within the production phases the task shoot scene 1 is shown. A needed resource for shooting scene 1 is a camera. Three available cameras for the dates on which scene 1 will be shot are shown. The resources that are tentatively held or booked for a task as well as the available resources are continuously synced with a vendors system, so that the most recent status updates are displayed on the timeline.

In some embodiments, tasks are automatically populated with resources when created (e.g., without specific action from a planner user). Automatic population is based on a preexisting hierarchy or prioritization of resources within a resource category matching the task. Given the time window of the task, the platform automatically compares to the schedules of the resources and iterates down the ranking list of resources, booking the highest ranked resource that is available during the specified time window.

In some embodiments, some resources are grouped or locked together. That is, if one resource of the group is booked, all of the resources in the group are booked (e.g., a particular sound mixer and the sound stage that the technician users). Further, if for whatever reason a different resource needs to be scheduled to replace one of the resources of the group, all of the group resources are rebooked using others. Similarly, as the platform identifies a particular performance date for a given set of resources, those resources that are used simultaneously are grouped so as to cause the performance date of those resources to book at the same time within their respective time windows.

Some resources are more important to the production than others. In an example where a given task requires two separate resources in different categories, and the top ranked resources are not both available in a matching time window, the platform must prioritize one of the resources. The higher priority resource is automatically booked first, and the subsequent resource bookings follow based on the availability of the higher priority resource.

Figure 13:
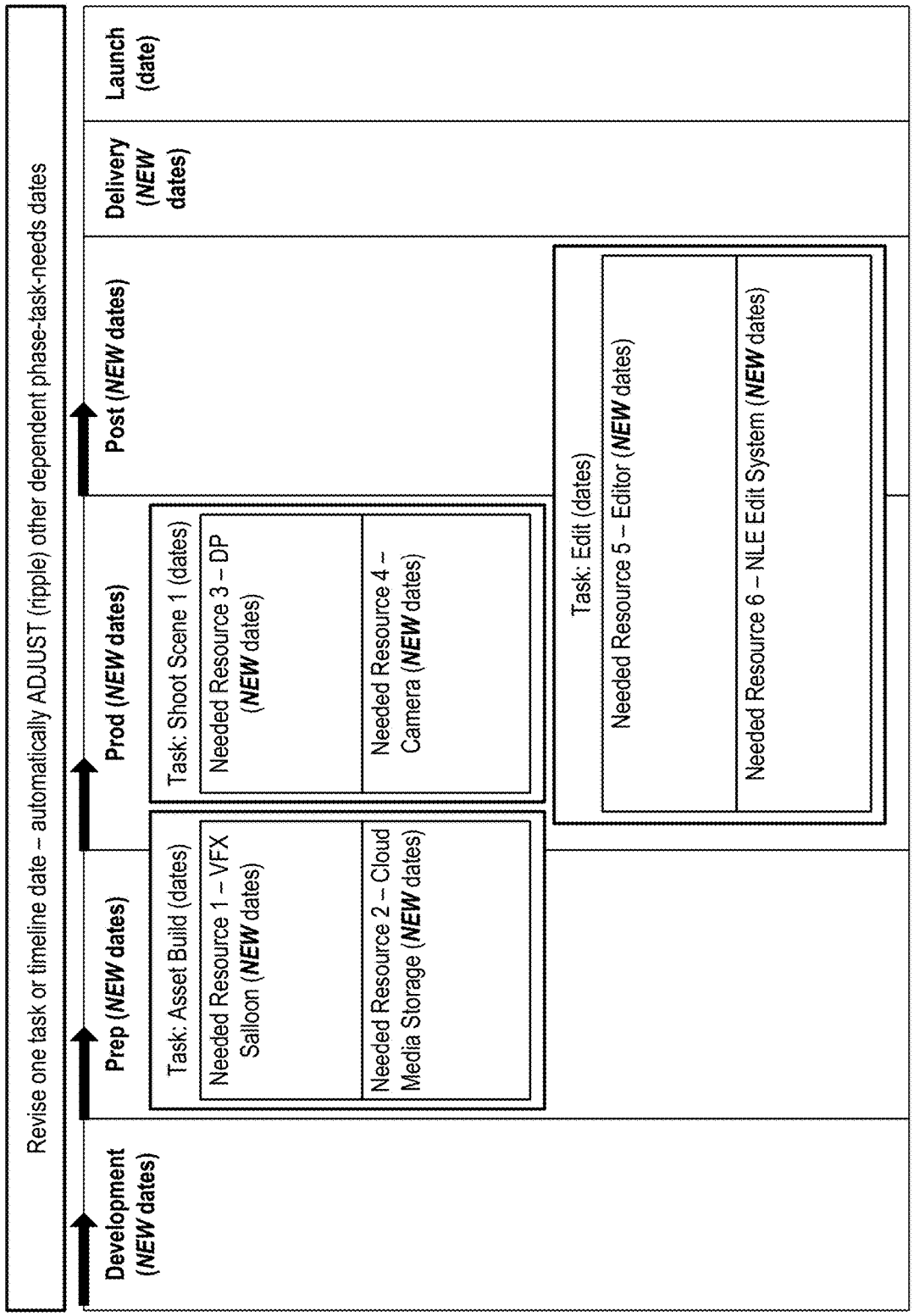
FIG. 13 illustrates how all items pinned to a timeline are updated when a task or timeline date are updated.

FIG. 13 illustrates how all items pinned to a timeline are updated when a task or timeline date are updated. According to one embodiment, a media production user updates a date to a new date for a phase or task of the media production. When the new date is entered, the system automatically updates all subsequent dates for phases and tasks on the timeline.

As is described with respect to FIG. 12, a given high priority resource may dictate the time window for a given task. In such circumstances, other resources required for that task are booked based on the high priority resource. The high priority resource may not be available during the initially stated time window for the task and thus the time window automatically shifts for that high priority resource. Shifting the time window for that task may cause other tasks to similarly shift. Where other tasks' time windows shift, resources are automatically rebooked for the shifted time window.

Priority of resources operates across tasks as well as within a given task. Thus, if a given high priority asset would cause time window shifts for numerous tasks including a task having a higher priority resource, either the task with the higher priority resource is not changed, or the given high priority resource is rebooked as the next resource in the ranking of similarly comparable resources.

Above, non-variable resources were described. One way to implement a non-variable resource is to simply place that resource in a highest priority tier. Resources that occupy the highest (or matching) priority tier cannot cause the other to rebook.

Figure 14:
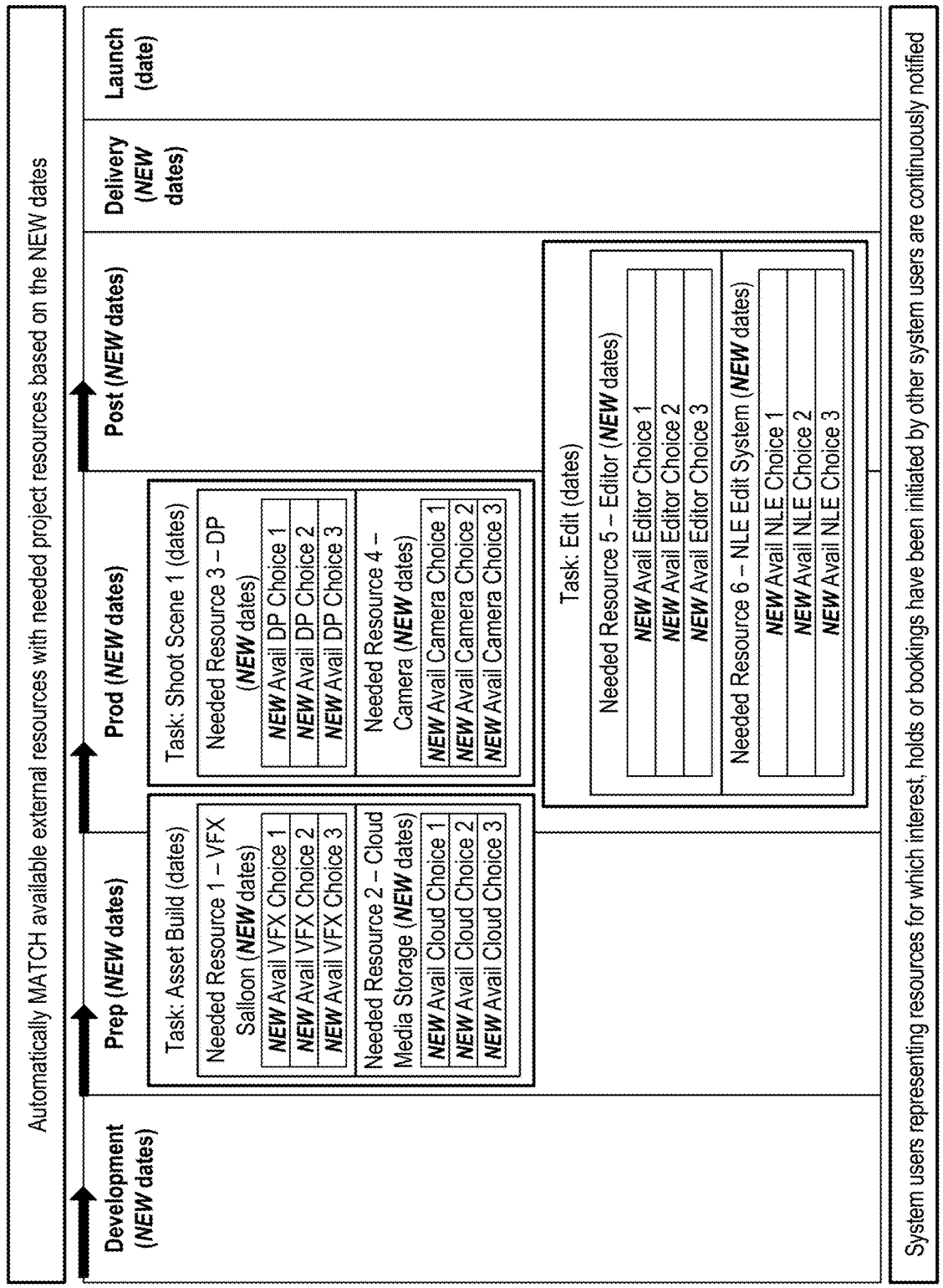
FIG. 14 illustrates that available resources are automatically populated when the timeline is updated.

FIG. 14 illustrates that available resources are automatically populated when the timeline is updated. Once the new date has been entered, then the computing system determines which resources will be affected. If a resource is no longer available on the new date, then the system displays similar resources that are available for the new date.

Figure 15:
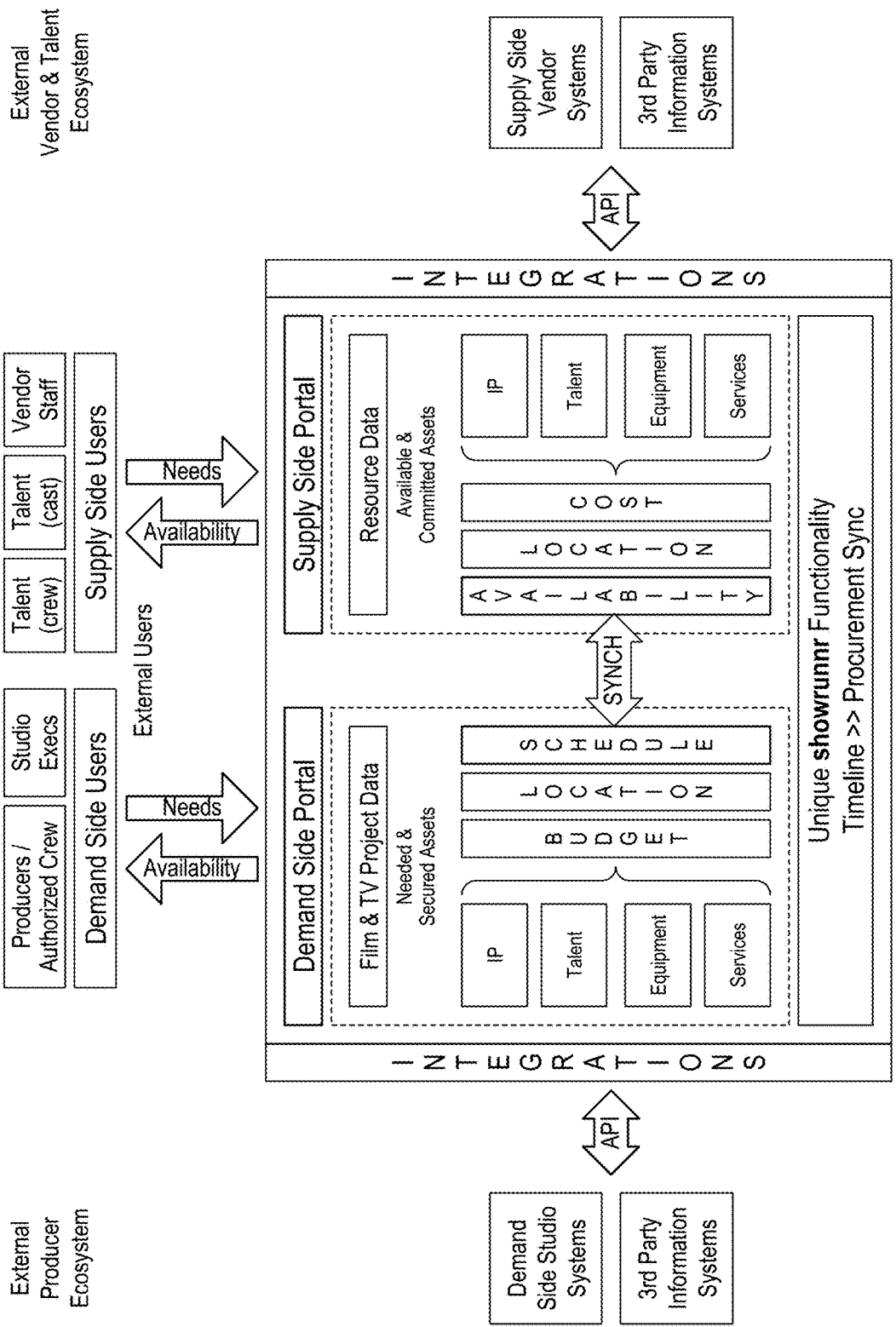
FIG. 15 illustrates the user facing system architecture.

FIG. 15 illustrates the user facing system architecture. A schematic illustrating the integration with the system architecture and external vendor and individual user ecosystem is shown.

The platform automatically reconciles numerous demand-based time windows with the availability of numerous resources. The reconciliation is performed simultaneously which is different than a human booking agent would do. The way a human booking agent operates is via a series of rebookings that occur individually. Human agents do not operate with an objective priority hierarchy to resolve collisions. The scheduling platform evaluates numerous optimization conditions (e.g., executes a modified traveling salesman computational model) in parallel according to priority rules and/or grouping rules, and applies a set of preconfigured limitations to each path. Preconfigured limitations are based on the production budget as corn pared to the stated rates of the resource, where a given task is to physically take place as corn pared to where the available resources are, and the time window of the tasks as corn pared to availability of the resource.

The platform further incorporates plugins to existing software platforms such as calendar applications where a given individual stores their daily schedule.

Figure 16:
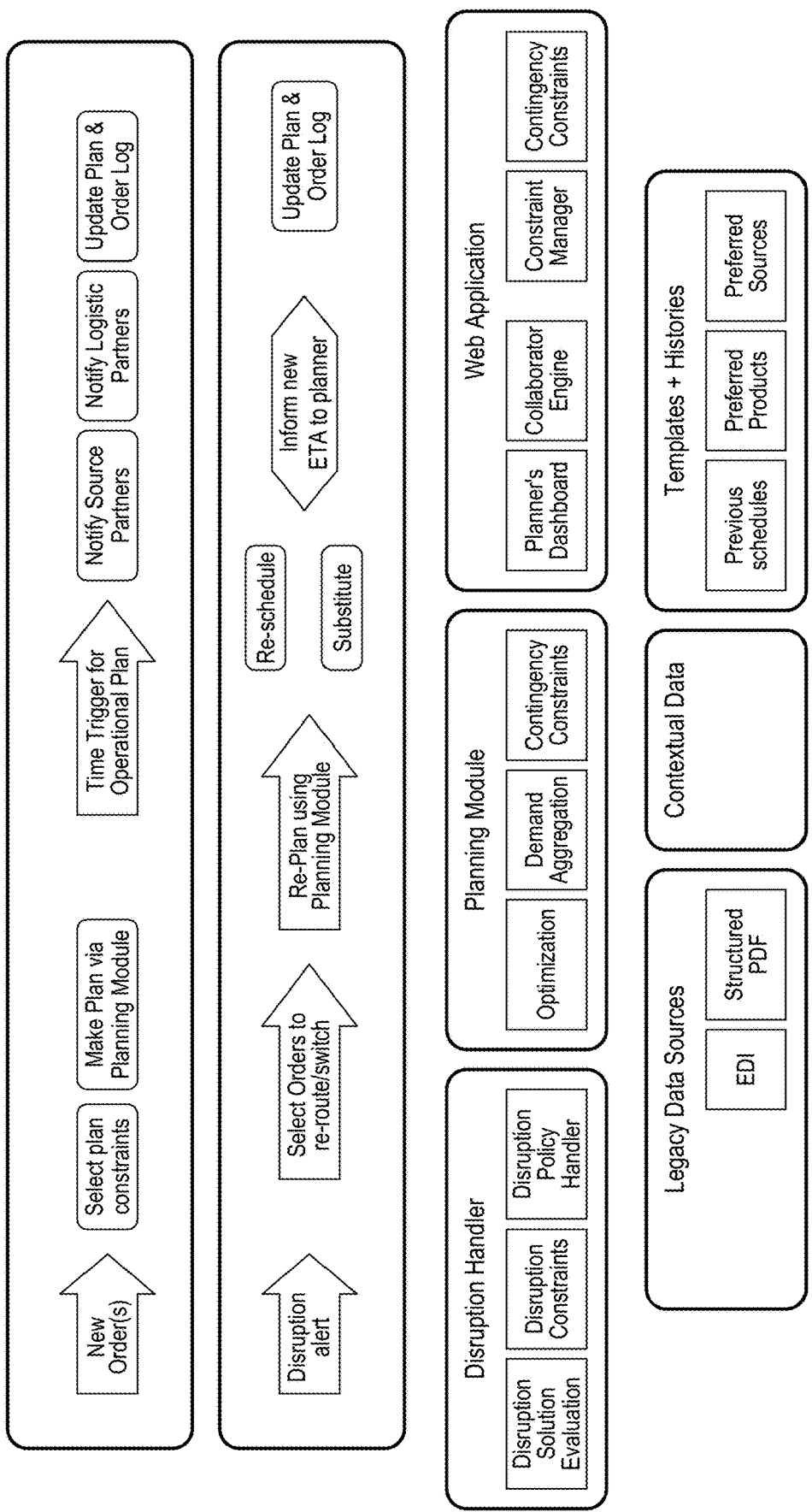
FIG. 16 illustrates the resource disruption management module.

FIG. 16 illustrates the resource disruption management module. It shows a disruption handler, planning module, web application, legacy data source, contextual data, templates, and histories.

Figure 17:
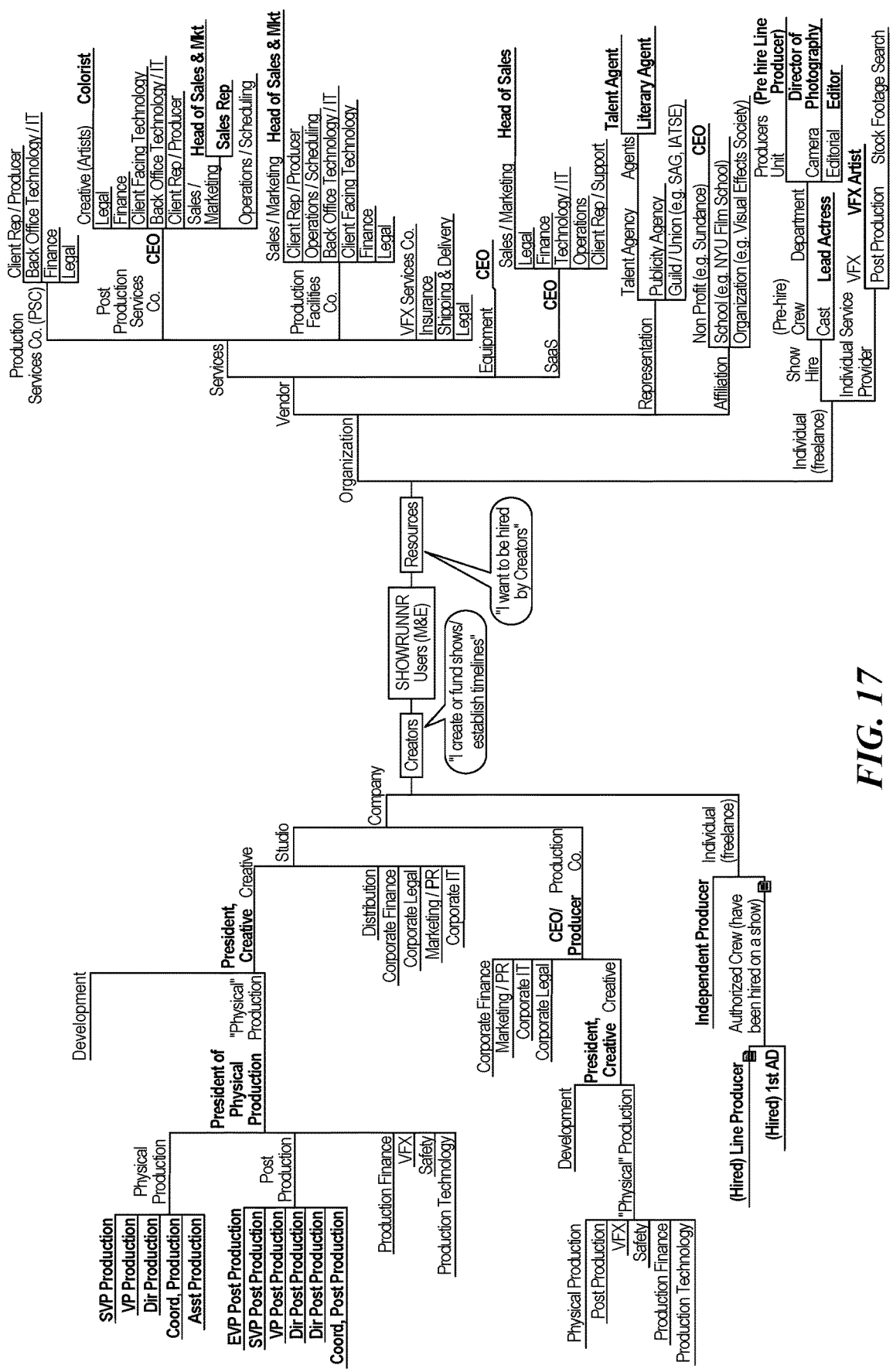
FIG. 17 is a schematic of system architecture.

FIG. 17 is a schematic of system architecture. A diagram of the end user ecosystem connected by the system is shown.

Figure 18:
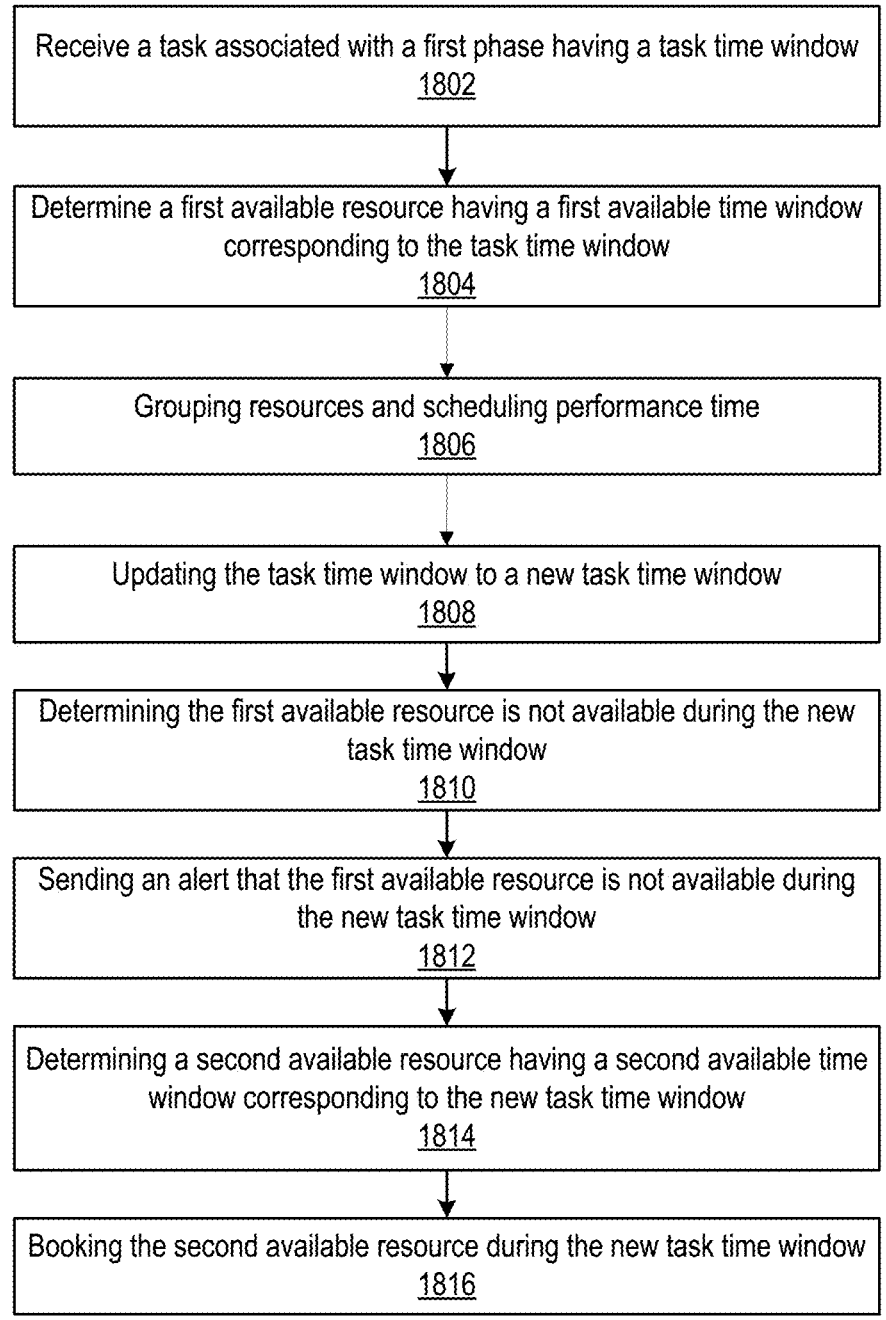
FIG. 18 illustrates by means of a flow chart a method for alerting a user of a scheduling conflict.

FIG. 18 is a flow chart illustrating a method for alerting a user of a scheduling conflict and rebooking. In step 1802, a platform receives input from a planner user describing a task. The task is associated with a phase of media production and includes a task time window. The time window refers to a period wherein performance of the task may occur. The time window is typically longer than the required time to perform the task in order to enable inherent flexibility of resources that are booked to the task. The time window is determined based on the phase of production and a historical variability of the performance date of the task associated therewith. The performance date is scheduled within the time window based on other resources and how their respective time windows line up.

In step 1804, a computer system determines an available resource within the available time window corresponding to the task time window. Available resources are identified from a predetermined list of resources that include metadata, which further include rates for the resource, where the resource is located, the availability of the resource, and the rating/ranking for the resource as corn pared to other resources in the same class (e.g., all directors of photography) and/or other resources of all classes (e.g., all directors of photography, all camera operators, all sound mixers, etc.).

Time availability of a resource does not necessarily have to be contiguous. That is, a given resource may indicate that they are generally available during a period with the exception of some relatively short periods (e.g., a single day or conflicts during a day). The comparison of the task time window to the availability time window of the resource need not be a 1-to-1 match, and the platform may tolerate some variation between the two time windows. In some embodiments, the variation tolerance in time windows varies based on the ranking of the resource. Higher ranked resources have greater variation tolerance in the time window mismatches.

Ranking within the same class is used to determine which resource to book and ranking/priority over other classes is used to determine which resources can cause time window shifts in other resources. Metadata such as the rates for each resource is further used to filter the resources considered for a particular task.

Step 1804 may be performed multiple times in parallel to book multiple resources simultaneously. To perform the step in parallel, selections of resources for all tasks are chosen at the highest level of preference possible, and then each potential booking is checked against each other to identify conflicts/collisions. Where there is a conflict or collision, the platform attempts to resolve the conflict or collision by modifying the resource having the lower rank in the collision. If that modification does not generate a collision-free selection of resources, the process of selecting all resources in parallel is repeated using lower rank resources.

Once a set of resources is identified that contains no conflicts, the resources are automatically booked.

In step 1806, the booked resources are automatically assigned performance times within their availability time windows. The performance time refers to when the task is actually performed by or with the resource within the time window. In some cases, the resources are booked together as a group based on the resource class and/or predetermined settings that link those resources together (e.g., members of a team, or physical equipment or venues that come with specific people). Performance times are narrower than the time windows that the performance times are placed in. Where a planner/administrative user wishes to modify the performance time, so long as the shift is within the time windows of the relevant resources, the change can be made automatically. In that case, the performance time automatically updates for affected resources to a new performance time within their respective time windows.

In step 1808, the time window of the task is updated. There are multiple reasons for a time window task update. The time window may change based on modifications in a non-variable resource's availability (e.g., lead actor is injured and needs to heal before continuing) or the shifting of a contiguous task in the same or another phase of production. Regardless of the reason, a task time window is shifted. Depending on the shift, this may force performance times to change.

In step 1810, the platform determines that the change in the time window causes at least one of the resources to become unavailable based on the new time window. In step 1812, the platform sends an alert to the planner user. In step 1814, the platform identifies a new resource to replace the prior resource based on the same hierarchy/ranking as used in step 1804. In step 1816, the new resource is automatically booked.

The first available resource and second available resource can comprise media production personnel, a filming location, a piece of filming equipment, a support service for filming or any other person, or a device or service that is used to create a media production. The task to be performed can be shooting a scene or editing a media production.

According to another embodiment, in response to the time window changing, the same resource may be rebooked. It is of course possible that the resource does not have a conflict with the new time window and may be similarly rebooked.

Figure 19:
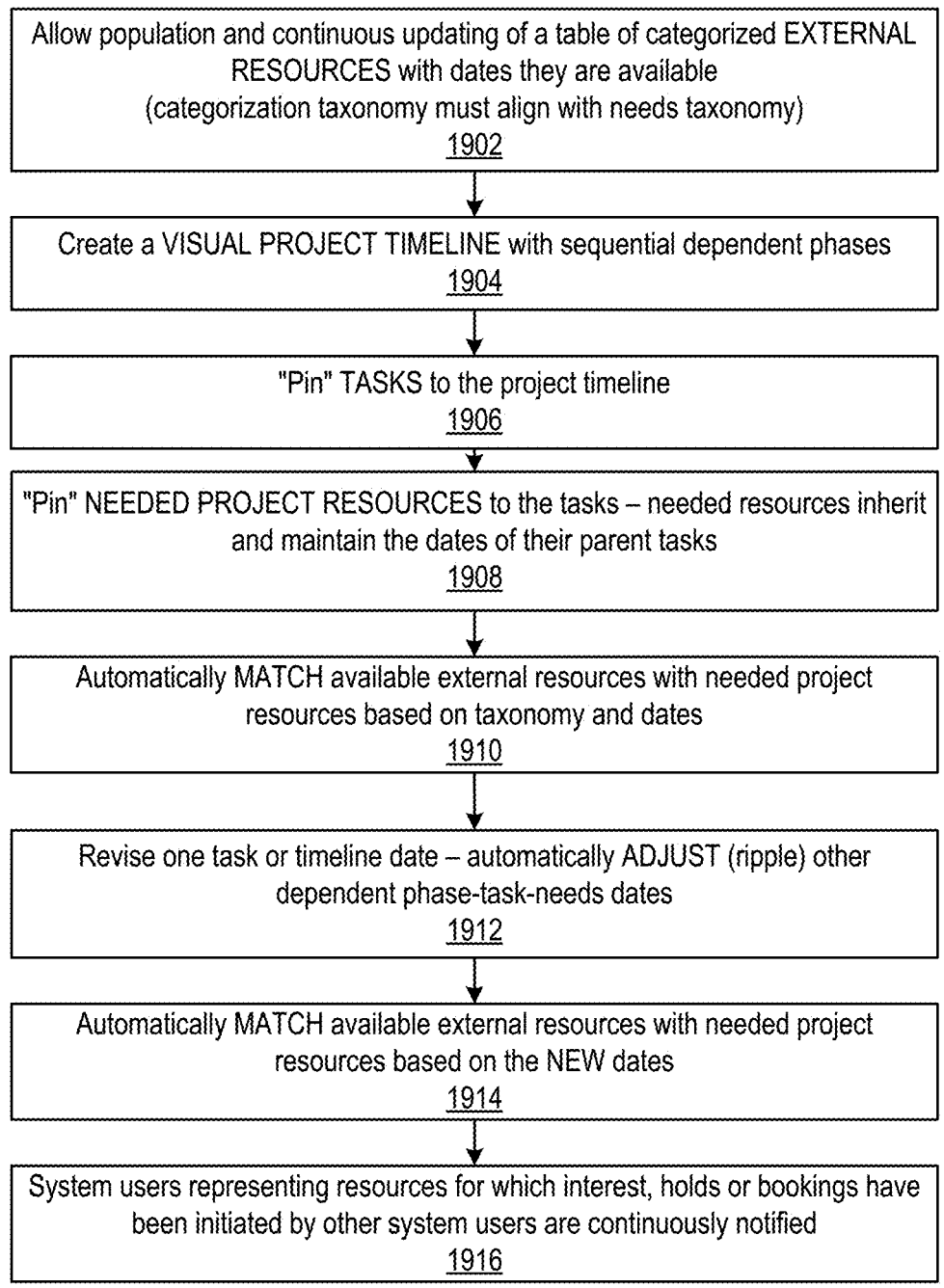
FIG. 19 illustrates by means of a flow chart a method for updating a schedule and bookings.

FIG. 19 is a flow chart that illustrates a method for updating a schedule and bookings. In step 1902, the platform allows populating and continuous updating of a table of categorized external resources with dates they are available (categorization taxonomy must align with needs taxonomy). In step 1904, the platform generates a visual project timeline with sequential dependent phases. In step 1906, the platform pins tasks to the project timeline based on planner user input or via data extracted from production documents uploaded to the platform.

In step 1908, the platform pins needed project resources to the tasks: needed resources inherit and maintain the dates of their parent tasks. In step 1910, the platform automatically matches available external resources with needed project resources based on taxonomy and dates. In step 1910, a triggered event causes the platform to revise one task or timeline date and automatically adjust (ripple) other dependent phase-task-needs dates. In step 1912, the platform automatically matches available external resources with needed project resources based on the new dates. In step 1914, the system users representing resources for which interest, holds, or bookings have been initiated by other system users are continuously notified.

Figure 20:
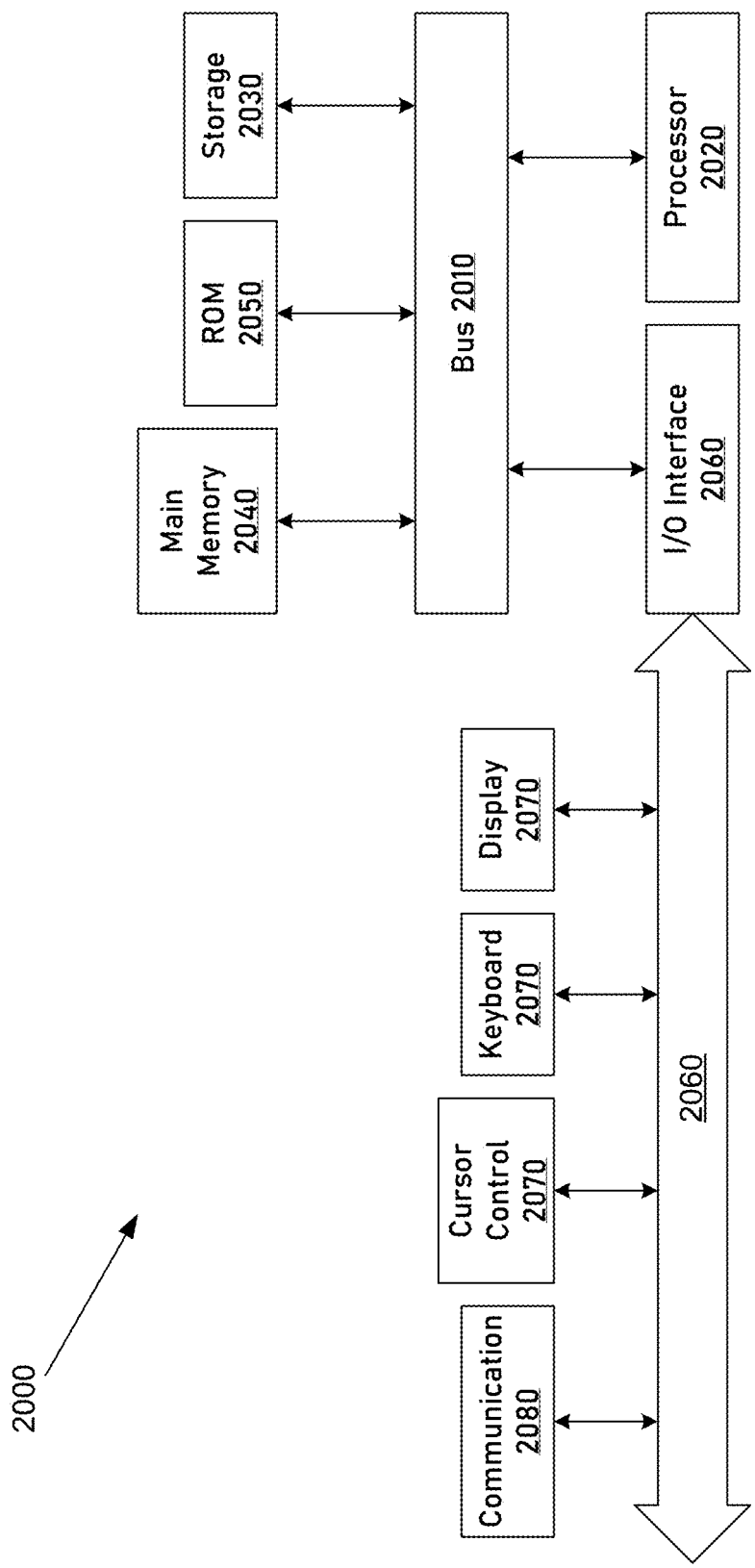
FIG. 20 illustrates an exemplary computer architecture for use with the present system, in accordance with some embodiments.

FIG. 20 illustrates an exemplary computer architecture for use with the present system, according to one embodiment. One embodiment of architecture 2000 comprises a system bus 2010 for communicating information, and a processor 2020 coupled to bus 2010 for processing information. Architecture 2000 further comprises a random access memory (RAM) or other dynamic storage device 2030 (referred to herein as main memory) coupled to bus 2010 for storing information and instructions to be executed by processor 2020. Main memory 2040 also may be used for storing temporary variables or other intermediate information during execution of instructions by processor 2020. Architecture 2000 also may include a read-only memory (ROM) and/or other static storage device 2050 coupled to bus 2010 for storing static information and instructions used by processor 2020.

The architecture 2000 further communicates with an input/output interface 2060. The I/O interface 2060 may be communicatively connected to a number of peripherals 2070 and/or Internet communications interfaces 2080.

References in this specification to "an embodiment," "one embodiment," or the like mean that the particular feature, structure, or characteristic being described is included in at least one embodiment of the present disclosure. Occurrences of such phrases in this specification do not necessarily all refer to the same embodiment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer; a client computer; a personal computer (PC); a tablet PC; a laptop computer; a set-top box (STB); a personal digital assistant (PDA); a cellular telephone; an iPhone; a Blackberry; a processor; a telephone; a web appliance; a network router, switch or bridge; or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state fora binary one to a binary zero or vice-versa in a memory device may comprise a transformation, such as a physical transformation. Rather, the foregoing is intended to show illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method for alerting a user of a resource conflict on a media production timeline, the method comprising:
   receiving, by a processor, user input into a timeline interface for a media production indicating a task, the task having a task time window, a set of personnel, equipment, or services requirements, and a scheduled performance period, wherein the time window is greater than a time required to complete the task and the scheduled performance period is within the time window;
   identifying, based on resource metadata stored in a master database, scheduled entities with availability to provide resources for the media production matching the personnel, equipment, or services requirements of the task, the availability including times that fall outside the scheduled performance period and are within the time window;
   obtaining a set of rules that define scheduling of the scheduled entities based on priority or grouping of resources associated with the scheduled entities;
   automatically scheduling, by the processor, a first scheduled entity and a second scheduled entity from the identified scheduled entities as available to provide resources to the task for the scheduled performance period and during the times that fall outside the scheduled performance period but are within the time window;
   displaying, by the processor, user interface elements associated with the first scheduled entity and the second scheduled entity as scheduled for the scheduled performance period on the timeline interface;
   receiving, by the processor, an alert message on the timeline interface for the media production that the first scheduled entity is unavailable for the scheduled performance period;
   in response to receiving said alert message, automatically generating, by the processor, an updated performance period within the time window based on the set of rules, wherein the second scheduled entity is already scheduled as available during the updated performance period;
   providing, by the processor, on the timeline interface, a suggestion to the user to book the second scheduled entity for the updated performance period;
   receiving, by the processor, a user response indicating acceptance of the suggestion; and
   based on the user response and in accordance with the set of rules: rescheduling, by the processor, the second scheduled entity to the updated performance period within the time window; and
   automatically shifting, by the processor, the user interface element associated with the second scheduled entity to the updated performance period on the timeline interface.

2. The method of claim 1, further comprising:
   automatically scheduling a third scheduled entity to the task for the scheduled performance period independent from the time window and an availability window of the third scheduled entity; and
   in response to said generating, automatically transmitting a notice to the third scheduled entity requesting availability at the updated performance period.

3. The method of claim 1, wherein said automatic scheduling further includes:
   identifying scheduled entities from a list of scheduled entities that are each in a ranking order within subcategories associated with particular services rendered.

4. The method of claim 1, wherein the first scheduled entity and the second scheduled entity comprise media production personnel, a filming location, a piece of filming equipment, a support service for filming or any other person, device or service that is used to create a media production.

5. The method of claim 3, wherein the task further comprises a phase and the subcategories associated with particular services rendered are associated with the phase.

6. The method of claim 2, further comprising:
in response to receiving an indication of availability from the third scheduled entity, automatically rescheduling the third scheduled entity to the updated performance period within the time window.

7. The method of claim 1, wherein the first scheduled entity is non-variable and modifications to other scheduled entities do not cause rescheduling of the first scheduled entity.

8. A system for alerting a user of a resource conflict on a media production timeline, the system comprising:
a processor; and
a memory including instructions that when executed, cause the processor to:
receive user input into a timeline interface for a media production indicating a task, the task having a task time window, a set of personnel, equipment, or services requirements, and a scheduled performance period, wherein the time window is greater than a time required to complete the task and the scheduled performance period is within the time window;
obtain a set of rules that define scheduling of the scheduled entities based on priority or grouping of resources associated with the scheduled entities;
identify, based on resource metadata stored in a master database, scheduled entities with availability to provide resources for the media production matching the personnel, equipment, or services requirements of the task, the availability including times that fall outside the scheduled performance period and are within the time window;
display user interface elements associated with the first scheduled entity and the second scheduled entity as scheduled for the scheduled performance period on the timeline interface;
automatically schedule a first scheduled entity and a second scheduled entity from the identified scheduled entities as available to provide resources to the task for the scheduled performance period and during the times that fall outside the scheduled performance period but are within the time window;
receive an alert message on the timeline interface for the media production that the first scheduled entity is unavailable for the scheduled performance period;
in response to receiving said alert message, automatically generate an updated performance period within the time window based on the set of rules, wherein the second scheduled entity is already scheduled as available during the updated performance period;
provide, on the timeline interface, a suggestion to the user to book the second scheduled entity for the updated performance period;
receive a user response indicating acceptance of the suggestion; and
based on the user response and in accordance with the set of rules:
reschedule the second scheduled entity to the updated performance period within the time window; and
automatically shifting the user interface element associated with the second scheduled entity to the updated performance period on the timeline interface.

9. The system of claim 8, the memory including further instructions that when executed, cause the processor to:
automatically schedule a third scheduled entity to the task for the scheduled performance period independent from the time window and an availability window of the third scheduled entity; and
in response to said generating, automatically transmit a notice to the third scheduled entity requesting availability at the updated performance period.

10. The system of claim 8, wherein the instruction to automatically schedule, when executed, cause the processor to further:
identify scheduled entities from a list of scheduled entities that are each in a ranking order within subcategories associated with particular services rendered.

11. The system of claim 8, wherein the first scheduled entity and the second scheduled entity comprise media production personnel, a filming location, a piece of filming equipment, a support service for filming or any other person, device or service that is used to create a media production.

12. The system of claim 10, wherein the task further comprises a phase and the subcategories associated with particular services rendered are associated with the phase.

13. The system of claim 9, the memory including further instructions that when executed, cause the processor to:
in response to receiving an indication of availability from the third scheduled entity, automatically reschedule the third scheduled entity to the updated performance period within the time window.

14. The system of claim 8, wherein the first scheduled entity is non-variable and modifications to other scheduled entities do not cause rescheduling of the first scheduled entity.

15. A non-transitory computer-readable medium having stored thereon instructions that, when executed by one or more processors, cause the one or more processor to perform operations including:
receiving user input into a timeline interface for a media production indicating a task, the task having a task time window, a set of personnel, equipment, or services requirements, and a scheduled performance period, wherein the time window is greater than a time required to complete the task and the scheduled performance period is within the time window;
identifying, based on resource metadata stored in a master database, scheduled entities with availability to provide resources for the media production matching the personnel, equipment, or services requirements of the task, the availability including times that fall outside the scheduled performance period and are within the time window;
obtaining a set of rules that define scheduling of the scheduled entities based on priority or grouping of resources associated with the scheduled entities;
automatically scheduling a first scheduled entity and a second scheduled entity from the identified scheduled entities as available to provide resources to the task for the scheduled performance period and during the times that fall outside the scheduled performance period but are within the time window;
displaying user interface elements associated with the first scheduled entity and the second scheduled entity as scheduled for the scheduled performance period on the timeline interface;
receiving an alert message on the timeline interface for the media production that the first scheduled entity is unavailable on the scheduled performance period;
in response to receiving said alert message, automatically generating an updated performance period within the time window based on the set of rules, wherein the second scheduled entity is already scheduled as available during the updated performance period;

providing, on the timeline interface, a suggestion to the user to book the second scheduled entity for the updated performance period;

receiving a user response indicating acceptance of the suggestion; and based on the user response and in accordance with the set of rules:

rescheduling the second scheduled entity to the updated performance period within the time window; and automatically shifting the user interface element associated with the second scheduled entity to the updated performance period on the timeline interface.

16. The non-transitory computer-readable medium of claim 15, having stored thereon further instructions that, when executed by one or more processors, cause the one or more processor to perform operations including:

automatically scheduling a third scheduled entity to the task for the scheduled performance period independent from the time window and an availability window of the third scheduled entity; and in response to said generating, automatically transmitting a notice to the third scheduled entity requesting availability at the updated performance period.

17. The non-transitory computer-readable medium of claim 15, wherein said automatic scheduling further includes:

identifying scheduled entities from a list of scheduled entities that are each in a ranking order within subcategories associated with particular services rendered.

18. The non-transitory computer-readable medium of claim 15, wherein the first scheduled entity and the second scheduled entity comprise media production personnel, a filming location, a piece of filming equipment, a support service for filming or any other person, device or service that is used to create a media production.

19. The non-transitory computer-readable medium of claim 17, wherein the task further comprises a phase and the subcategories associated with particular services rendered are associated with the phase.

20. The non-transitory computer-readable medium of claim 15, having stored thereon further instructions that, when executed by one or more processors, cause the one or more processor to perform operations including:

in response to receiving an indication of availability from the third scheduled entity, automatically rescheduling the third scheduled entity to the updated performance period within the time window.

21. The non-transitory computer-readable medium of claim 15, wherein the first scheduled entity is non-variable and modifications to other scheduled entities do not cause rescheduling of the first scheduled entity.

* * * * *